United States Patent [19]
Templeman

[11] Patent Number: 5,845,303
[45] Date of Patent: Dec. 1, 1998

[54] DOCUMENT PROCESSING USING FRAME-BASED TEMPLATES WITH HIERARCHICAL TAGGING

[75] Inventor: Michael L. Templeman, Seattle, Wash.

[73] Assignee: Netpodium, Inc., Seattle, Wash.

[21] Appl. No.: 724,219

[22] Filed: Oct. 2, 1996

Related U.S. Application Data

[63] Continuation of Ser. No. 350,447, Dec. 6, 1994, abandoned.

[51] Int. Cl.$^6$ ........................................... G06F 7/06
[52] U.S. Cl. ...................... 707/517; 707/514; 707/517
[58] Field of Search ........................... 395/766, 768, 395/769, 776, 777, 779, 780, 782, 784, 788, 802; 382/176; 707/505, 507, 508, 514, 515, 517, 518, 520, 522, 526, 539

[56] References Cited

U.S. PATENT DOCUMENTS

| | | | |
|---|---|---|---|
| 4,948,283 | 8/1990 | Imaizumi et al. | 400/647.1 |
| 5,051,930 | 9/1991 | Kuwabara et al. | 395/148 |
| 5,151,975 | 9/1992 | Shiraki et al. | 395/153 |
| 5,179,646 | 1/1993 | Kawakami et al. | 395/145 |
| 5,181,162 | 1/1993 | Smith et al. | 364/419 |
| 5,263,133 | 11/1993 | Hyakutake et al. | 395/147 |
| 5,270,705 | 12/1993 | Duffy | 340/870.13 |
| 5,276,792 | 1/1994 | Masaki | 395/146 |
| 5,293,473 | 3/1994 | Hesse et al. | 395/146 |
| 5,319,546 | 6/1994 | Nishino | 364/405 |
| 5,333,246 | 7/1994 | Nagasaka | 395/133 |
| 5,347,625 | 9/1994 | Kajimoto et al. | 395/145 |
| 5,381,523 | 1/1995 | Hayashi | 395/145 |
| 5,495,565 | 2/1996 | Millard et al. | 707/506 |

FOREIGN PATENT DOCUMENTS 2258552  2/1993  United Kingdom .

OTHER PUBLICATIONS

Stallings, *Business Data Communications*, Macmillan Publishing Company, 1990, pp. 364 and 569.

*Yeartech Guide to Desktop Publishing Yearbooks*, Jostens Yearbook Technology, 1992, pp. ii–iX, 3–11 to 3–16 and 7–1 to 7–12.

Shu, et al., "Convert: A High Level Translation Definition Language for Data Conversion," *CACM*, 18:10, p. 557 (1975).

de Jong, et al., "Intelligent Forms Creation in the System for Business Automation," *IBM Technical Report RC8529*, Oct. 1980.

Luo, et al., "Form Operation by Example—a Language for Office Information Processing," *ACM SIGMOD Conference*, p. 212, (1981).

Tsichritzis, "Form Management," *CACM*, 25:7, p. 453, (1982).

Shu, "Specification of Forms Processing and Business Processing and Business Procedures for Office Automation," *IEEE Transactions on Software Engineering*, SE–8:5, p. 499, Sep. 1982.

(List continued on next page.)

*Primary Examiner*—Stephen S. Hong
*Attorney, Agent, or Firm*—Townsend and Townsend and Crew LLP

[57] ABSTRACT

A system and method for manipulating and displaying information in a computer system includes a display screen, a processor, a storage device, and a data input device. Input data is received in the system through the input device. The system determines a display format of the data. The display format includes a number of constraints on the display. The system associates the input data with the appropriate display frame and flows the data into the frame. Constraints on the display are solved as the data is flowed (or moved) into a frame or frames. Upon resolution of constraints, the display frame is sized to accommodate the input data and the frame is displayed on the computer display screen.

14 Claims, 5 Drawing Sheets

OTHER PUBLICATIONS

Feather, "Program Specification Applied to a Text Formatter," *IEEE Transactions on Software Engineering*, SE–8:5, 491, Sep. 1982.

Rowe, et al., "A Form Application Development System," *ACM SIGMOD Conference*, 28, 1982.

Archer, Jr., et al. "Display Condensation of Program Text," *IEEE Transactions on Software Engineering*, SE–8:5, p. 526, Sep. 1982.

Ferrans, "SEDL—A Language for Specifying Integrity Constraints on Office Forms," *ACM SIGOA Conference on Office Information Systems*, p. 123, Jun. 1982.

Noot, "Structured Text Formatting Software Practice and Experience," 13:1, p. 79, 1993.

Woo, et al., "A System for Interactively Designing Message Templates," *IEEE Compcon*, p. 27 (1983).

Kitagawa, et al., "Form Document Management System: Its Architecture and Implementation," *ACM SIGOA Conference on Office Information Systems*, p. 132, Jun. 1984.

Lee, et al., "Officeaid: An Integrated Document Management System," *ACM SIGOA Conference on Office Information Systems*, p. 170, Jun. 1984.

Embley, et al., "Office Form Definition and Processing Using a Relational Data Model," *ACM SIGOA Conference on Office Information Systems*, p. 123, Jun. 1984.

Sankar, "A Method to Simplify Filling Data Entry Forms," *ACM SIGDOC Asterisk*, 10:4, p. 15, Dec. 1984.

Arno, et al., "Document Architecture and Text Formatting," *ACM Transactions on Office Information Systems*, 3:4, p. 347, Oct. 1985.

Trigg, et al., "TEXTNET: A Network–Based Approach to Text Handling," *ACM Transactions on Office Information Systems*, 4:1, Jan. 1986.

Malone, et al., "Intelligent Information–Sharing Systems," *CACM*, 30:5, p. 390, 1987.

Mamrak, "Translation among WYSIWYG Word Processors in Chameleon," *ACM SIGOIS Bulletin*, 9:1, p. 14 (1988).

Koo, "A Model for Electronic Documents," *ACM SIGOIS Bulletin*, 10:1, p. 23, 1989.

de La Beaujardiere, "Well Established Document Interchange Formats," Xerox PARC, EDL–89–1, 1989.

Stotts, et al., "Petri–Net–Based Hypertext: Document Structure with Browsing Semantics," *ACM Transactions on Office Information Systems*, 7:1 p. 3, Jan. 1989.

Guting, "An Algebra for Structured Office Documents," *ACM Transactions on Office Information Systems*, 7:4, p. 123, Apr. 1989.

Lutz, et al., "MAFIA—An Active Mail–Filter–Agent for an Intelligent Document Processing Support," *ACM SIGOIS Bulletin*, 11:4, p. 16, (1990).

Marovac, "Document Recognition—Concepts and Implementation," *ACM SIGOIS Bulletin*, 13:3, p. 28, (1992).

Rada, "Converting a Textbook to Hypertext," *ACM Transactions on Office Information Systems*, 10:3, p. 294, Jul., 1992.

Wang, et al., "A New Approach to Modeling Office Documents," *ACM SIGOIS Bulletin*, 14:2, p. 46, 1993.

Stahl, "The Form is in the (E)Mail," *Informationweek*, p. 42, Aug. 8, 1994.

DOCUMENT PROCESSING USING FRAME-BASED TEMPLATES WITH HIERARCHICAL TAGGING

This is a continuation of application Ser. No. 08/350.447, filed Dec. 6, 1994, now abandoned, the disclosure of which is incorporated by reference.

BACKGROUND OF THE INVENTION

The present invention relates generally to systems and methods for controlling and displaying information using computers.

Advances in computing technology have revolutionized the availability, transfer, presentation, and use of information. One advance has come in the area of computer hardware. Computers have shrunk in size while becoming more powerful. This has allowed the production of a variety of laptop and hand-held computer systems which enable users to create and manipulate data without being confined to an office with a desktop computer. Similar advances have allowed the creation of compact communications equipment such as credit card sized modems, faxes, and pagers compatible with these smaller computer systems. The result has been the proliferation of computer systems capable of sending and retrieving information from a diverse range of locations.

These advances in computing technology have been coupled with a tremendous increase in the amount of computer-accessible information. Commercial information repositories such as those provided by DIALOG™, PRODIGY™, LEXIS™, and the like store vast amounts of information accessible by anyone having a basic computer system and access privileges. Other pools of data may be accessed via the Internet or bulletin board systems (BBSs). Further, small, medium, and large-size companies frequently utilize electronic mail systems to allow employees to communicate with each other.

These advances enable individuals to access, retrieve, and share large amounts of information from a variety of computing platforms. The sheer volume of information available places a premium on a users ability to efficiently retrieve and assimilate the data. Unfortunately, however, all of this available data is not formatted in an optimal manner. To accommodate the wide range of computer types which can access, e.g., a BBS, the information stored on the system is typically formatted in a flat ASCII text file. Graphics, if used, are generally stored in a separate GIF file. Although these file formats are readable, they lose the ability to convey the information as originally intended. For example, when a magazine article is formatted for publication, page layout and formatting techniques are employed to make the article more legible and informative. A sidebar may be used to explain a relevant related topic which will aid the user in understanding the body of the article. The use of footnotes or endnotes can direct the reader to other helpful sources without adding unnecessary clutter to the article. Each page layout feature is designed to promote overall readability and to enhance the author's ability to convey information via the written word. All, or most, of these layout features are lost when the magazine article is converted for use in an on-line database, such as a BBS or DIALOG™. Rather than appearing as the author or publisher originally intended, the article will, instead, appear as one constant page of text. Although the power of the text to convey information is preserved, the enhanced ability to present that information in a structured, readable format is lost.

Figure 1A:
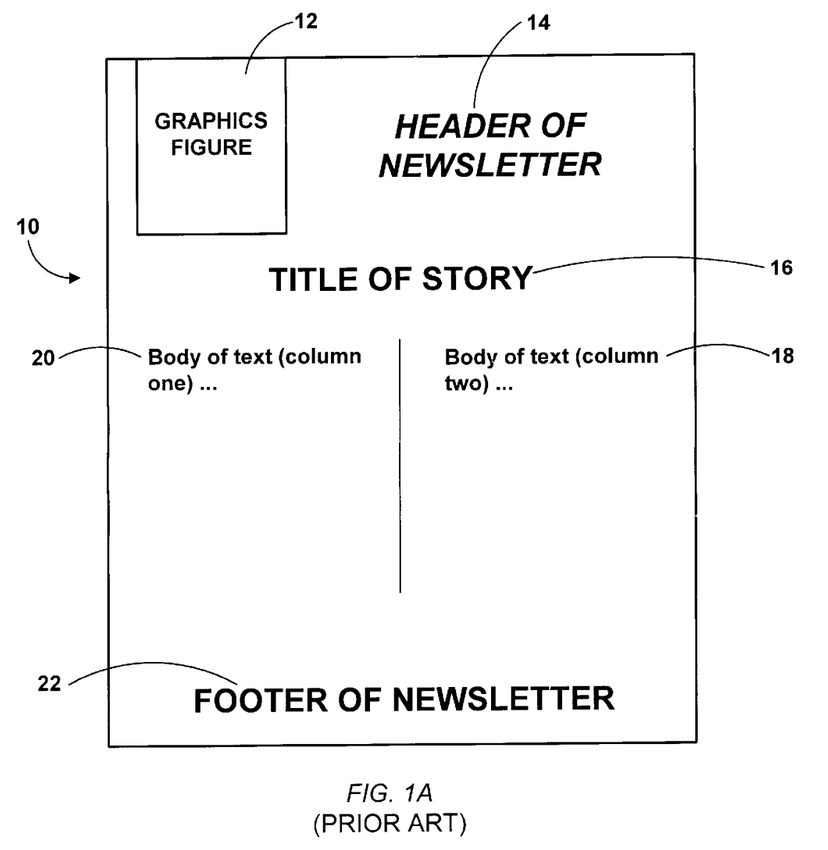
FIG. 1A is a typical format of a common hardcopy document.
Figure 1B:
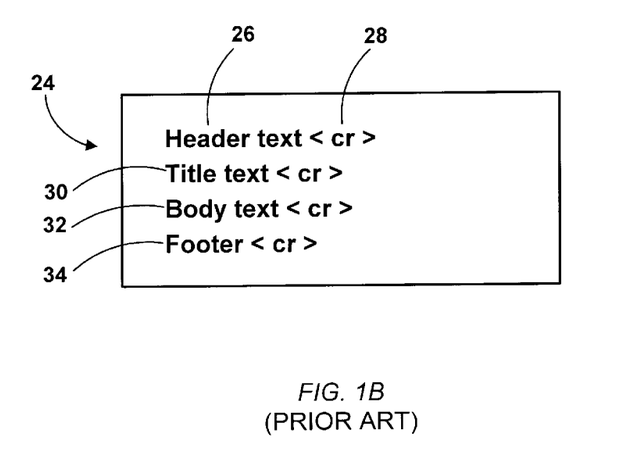
FIG. 1B is a representation of a format of a computerized representation of the hardcopy document of FIG. 1A.

An example of one type of hardcopy document which uses a structured format to convey information is a newsletter. A typical newsletter format is shown in FIG. 1A. The newsletter 10 may include graphics, such as a logo 12, and text, such as a header 14, a title 16, several columns 18, 20 and a footer 22. The graphics and text are arranged in a manner to improve readability of the document. Most newsletters are formatted in a manner similar to the one shown in FIG. 1A when they are printed in hardcopy form (e.g., printed on newsprint or other paper). Newsletters and other documents are being made available in computer formats in increasing frequency. Unfortunately, the formatting of the documents is typically lost when the documents are made available on-line. For example, were the sample newsletter 10 shown in FIG. 1A made available on a typical computer bulletin board system, no columns, graphics, or spacing would be retained. Instead, the well-designed, highly-readable newsletter would be reduced to a flat ASCII text file with carriage returns and, possibly, a separate graphics file for the logo. A representation of the contents of such a file is shown in FIG. 1B. In a typical system, the file 30 includes most of the information from the original printed document. However, the information is presented in a flat, unstructured file. Specifically, each portion of text is followed by one or more carriage returns 29 to set off each section of text. Further, many BBS's and other data repositories do not preserve the graphics content of documents stored on-line. Thus, the logo 12 of the original newsletter 10 may not be preserved in a typical file 30.

Others have attempted to standardize the formatting of on-line information. For example, the HyperText Markup Language (HTML) is a simple document markup system derived from the Standard Generalized Markup Language (SGML) which is used to format hypertext documents. HTML codes are used to describe how textual elements, such as paragraphs, lists, and quotes will be displayed. However, these markup languages are limited in that they do not allow the data to be sized or formatted for specific display devices. That is, these markup languages are primarily designed to ensure that a document printed by different systems retains the original structure. Other attempts to standardize the presentation and formatting of information include treating a document as an entire graphic image and displaying it in a "what you see is what you get" (WYSIWYG) format. However, this approach is unsatisfactory as it requires increased file sizes and demands that each user system includes document generation software.

The problem of presenting information in a readable format is compounded by the vast spectrum of computer platforms available. For example, a palm-sized personal digital assistant (PDA) has a much smaller screen size than a desktop workstation. The display of a typical business memo on the PDA screen presents a much more difficult problem than the presentation of the memo on the page-sized screen of the workstation. One solution would be to shrink the size of the memo to correspond to the smaller screen. This, however, is unsatisfactory as it may make the memo illegible. It may also result in a document having an excess of whitespace (i.e., blank spacing between text and/or graphics).

The increased use of portable computers to communicate and transmit information requires that designers minimize the size of files created and transmitted. For example, the smaller the file to be transmitted, the more efficient the transmission is in terms of cost, time, and utilization of system resources.

The present invention recognizes that it is highly desirable to provide users with an ability to create, transmit, and receive information formatted in a legible and useful manner. What is needed is a system and method which receives input information from a variety of sources and which displays the file in the manner originally intended by the creator of the document. More particularly, the system should adapt to enable display of information on a variety of platforms and display types. These functions should be performed quickly and efficiently.

SUMMARY OF THE INVENTION

A system and method are disclosed for manipulating and displaying information in a computer system. The system preferably includes a display screen and a data input device.

Input data is received in the system through the input device. The system uses information about the input data to determine a display format for the data. The display format preferably includes a number of constraints on the display. The system then associates the input data with an appropriate display frame and flows the data into the frame. By "flows" it is meant that the input data is put into a virtual area defined as a frame. Constraints on the display are solved as the data is flowed (i.e., as more data is put into a specific frame). Upon resolution of constraints, the display frame is sized to accommodate the input data and the frame is displayed on the computer display screen.

In one specific embodiment, the present invention utilizes a number of tags located in the input data stream to associate specific items of data with a specific display frame. The frames are also tagged to indicate the type of data which may be displayed within each frame. Display frames are organized into forms called "metaforms." These metaforms may be created to present information in a number of forms, including: newsletters, reports, business letters, and the like. Embodiments of the present invention allow automatic selection of the appropriate metaform for a particular set of input data. Other embodiments of the present invention allow the automatic selection of alternative metaform styles when the most appropriate form is not available in the host system.

The result is a system which allows the dynamic presentation of information on any host system, from desktop computers to personal digital assistants. The system is small and fast and may be used with existing data formats. Input file sizes are kept to a minimum, thereby reducing transmission time and costs. The formats are not tied to specific screen sizes or orientations, allowing the presentation of easy to read data on any size system.

For a fuller understanding of the nature and advantages of the invention, reference should be made to the ensuing description taken in conjunction with the accompanying drawings.

DESCRIPTION OF THE PREFERRED EMBODIMENT

Figure 2A:
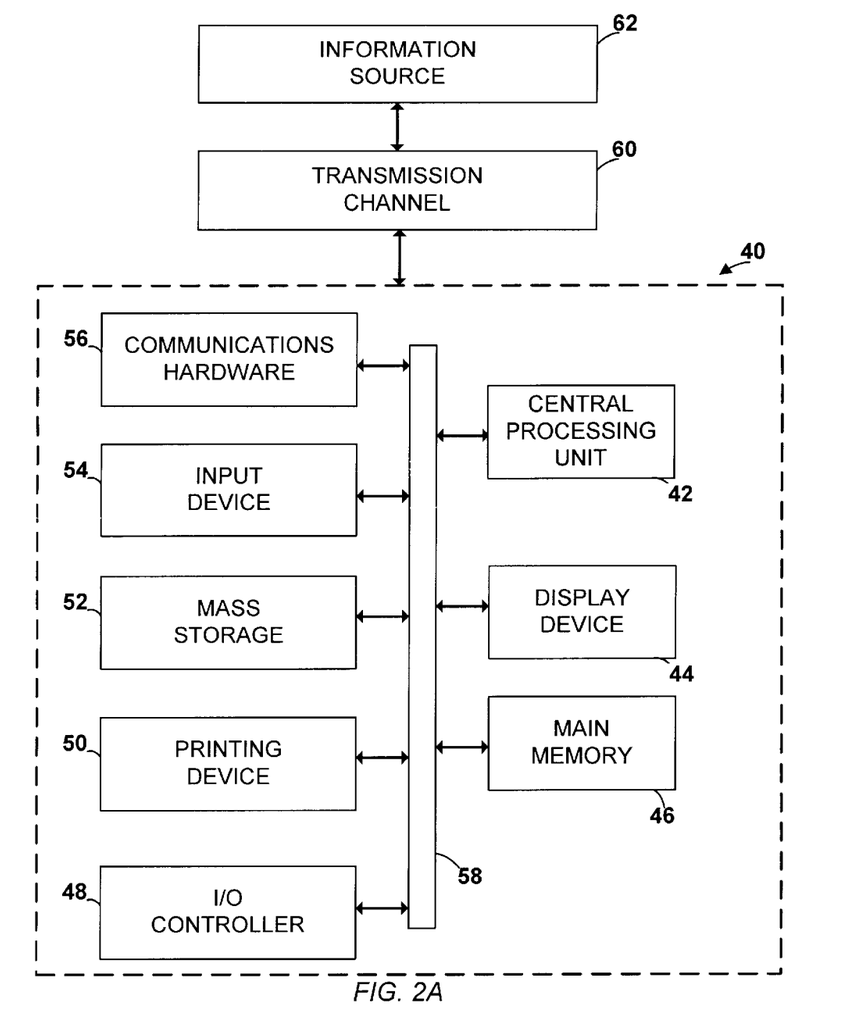
FIG. 2A is a block diagram of a computer system in which the present invention may be embodied.

The present invention may be implemented in a computer system such as the system 40 of FIG. 2A, which comprises a central processor 42, a display device 44, a main memory 46, an input/output controller 48, a mass storage system 52 (e.g., a hard disk, tape system, or the like), and at least a first input device 54 (e.g., any combination of keyboard, mouse, trackball, pen device, or the like). Additional input/output devices, such as a printing device 50, may be included in the system 40 as desired. Communications hardware 56, such as a modem, fax, ethernet card, or the like may also be connected to the system 40. As shown, the various components of the system 40 communicate with each other through a system bus 58 or similar architecture.

In one specific embodiment, the computer system 40 receives information or data from an information source 62 via a transmission channel 60. Information source 62 may comprise any source of information, including commercial databases, bulletin board systems, company e-mail systems, network servers, other stand-alone computer systems, or the like. Transmission channel 60 may be formed from, for example, telephone lines, fiber optic cables, wireless digital or analog channels, or copper wire. Those skilled in the art will realize that the present invention may be utilized in conjunction with any source of computer data received via any transmission means.

Figure 2B:
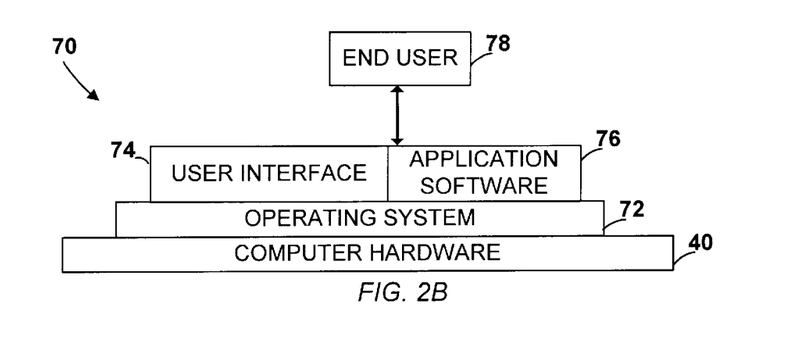
FIG. 2B is a block diagram of a software system of the present invention.

A simplified representation of a computer software system 70 is shown in FIG. 2B. The software system 70 is employed to control the operation of computer system 40. -Software system 70, which is stored in main memory 46 and in mass storage memory 52, includes a kernel or operating system 72 and a shell or user interface 74. One or more applications programs, such as applications software 76, may be "loaded" (i.e., transferred from storage memory 52 into main memory 46) for execution by the computer system 40. Under control of software 72 and/or application software 76, the system 40 receives user commands and data through user interface 74. The interface 74 also serves to display results on the display device 44, whereby a user 78 may interact with and control the system.

In one specific embodiment, system 40 is an IBM-compatible personal computer, available from a number of vendors (including IBM of Armonk, N.Y.). Operating system 72 is MS-DOS and interface 74 is Microsoft Windows, both of which are available from Microsoft Corp. of Redmond, Wash. In one specific embodiment, applications software 78 is implemented using Microsoft Visual C++ to achieve the functionality described herein. The present invention supports the use of any of a number of computer system 40 architectures. For example, computer system 40 may be a handheld computer, a personal information organizer, a personal communicator, a laptop computer, or the like. Further, the operating system 72 may additionally function as the user interface. Any of a number of operating systems and user interfaces may be used. Examples are Windows 95 or WinPad (both also available from Microsoft Corp.), Magic Cap (available from General Magic Inc. of Mountain View, Calif.), or Newton Script (available from Apple Computer Corp. of Cupertino Calif.). Those skilled in the art will recognize that the present invention may be embodied in any computer system 40 having an operating system 72. Further, applications software 78 may be implemented using any of a number of programming languages.

Figure 3A:
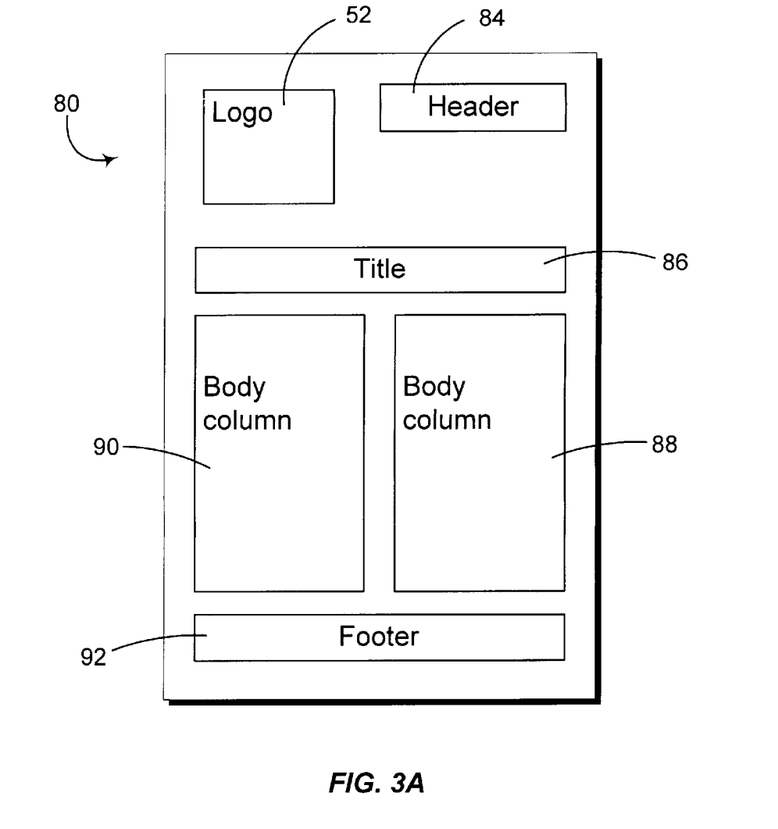
FIG. 3A is a representation of a screen display of the present invention displaying the document of FIG. 1A.

Features of the present invention, as will be discussed, allow information and documents such as the newsletter 10 of FIG. 1 to be presented in a readable format on any computer display device 44 when retrieved from an information source 62 such as a commercial database, bulletin board system, or the computer system's own mass storage device 52. Referring now to FIG. 3A, a representation of a metaform 80 as seen on display device 44 is shown. Metaforms are layouts or forms which have defined formats, including a number of frames into which specific type(s) of data may be input. Metaforms 80 may be used to present text and graphics data in a number of formats. The data may be reordered as well as remapped. Each metaform 80 includes a number of defined constraint relationships which govern the appearance and content of each metaform. Metaforms 80 according to the present invention may be displayed, e.g., on any size display device 44, including cathode ray tube (CRT) displays, liquid crystal displays (LCDs), or the like. These displays are typically formed of a plurality of pixel elements, positioned and referenced from the "origin" (top left of the screen) to the maximum coordinates located in the lower right of the screen. Metaforms may be customized for use with particular display types and sizes to optimally utilize available screen space.

The particular metaform 80 shown in FIG. 3A includes a plurality of frames 82–92 arranged in the form of a newsletter, such as the newsletter 10 of FIG. 1A. That is, the metaform 80 of FIG. 3A is a newsletter metaform. In the present invention, a frame is a dynamic template defined to receive specific items of information. Each of the frames are defined to receive either text or graphics data. For example, frame 82 has been defined to include graphics data, specifically, the letterhead or logo of a newsletter. Frames 84–92 contain text data. In this example, frame 84 includes header information, frame 86 includes title information, frames 88 and 90 contain the body of the newsletter, and frame 92 contains footer information. A variety of metaforms may be established for use in the present invention. Examples include memos, business letters, newspaper articles, electronic mail messages, technical reports, and the like. According to the present invention, as will be discussed in more detail infra, the specific metaform to be used with a particular set of data may either be selected by the user or be determined by software. The type of data each frame may accept is determined by a tag or set of tags which identifies the frame as accepting certain data. These tags correspond to tags used to identify input data.

Figure 3B:
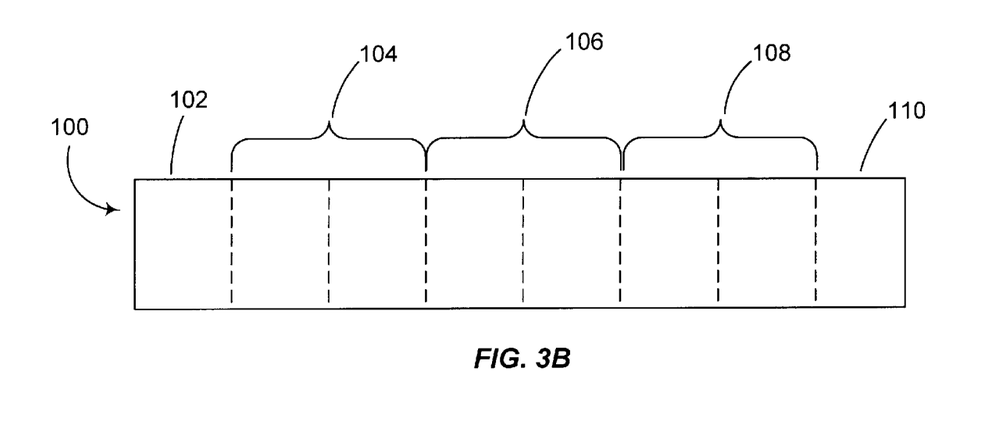
FIG. 3B is a representation of a format of a tag for use in the computer and software systems of FIG. 2.

Text and graphics data input to a system utilizing the present invention are displayed in the appropriate frames of a particular metaform using a plurality of tags which identify the various components of the metaform. For example, each of the components of the newsletter 10 of FIG. 1A would be tagged for use in the present invention. As shown in FIG. 3B, one specific embodiment of a tagging system for use in the present invention may consist of an eight character tag 100 having a leading field 102, several two character fields 104–108, and a trailing field 110. In this specific embodiment, the leading and trailing fields 102, 110 each contain backslash characters ("\") to alert the applications software 78 of impending tag characters. If the tag 100 is included in a text stream, the leading and trailing fields 102, 110 may be expanded to two characters in length. Double backslash characters "\\" may then be used to set the tag 100 off from the remainder of the text stream. Those skilled in the art will recognize that other techniques for identifying tags may also be used.

The first two character field is referred to as a flow tag 104. The flow tag 104 identifies the paragraph type and indicates the frame to which the paragraph is assigned. Examples of flow tags 104 are: BD (body); gr (graphic); lg (logo); ft (footer); HD (header), etc. Other flow tags 104 are shown in Table I.

TABLE I

| FLOW TAGS | CODE | FLOW TAGS | CODE |
|---|---|---|---|
| Abstract | ab | ISBN | IS |
| Addresses | as | Keywords | ky |
| Address | ad | Legend | lg |
| Animation | an | Level 1 | L1 |
| Arrows | ar | Level 2 | L2 |
| Author | au | Level 3 | L3 |
| Banner | ba | Level 4 | L4 |
| BCC | bc | Level 5 | L5 |
| Bibliography | bb | List | L2 |
| Body | BD | List 2 | L3 |
| Border | br | List 3 | L4 |
| Byline | by | List 4 | L5 |
| Callout | ca | Logo | lg |
| Caption | cp | Masthead | MH |
| CC | cc | Music | ms |
| Chart | ch | Page Number | pg |
| Colophon | co | Phone Number | pn |
| Copyright | cr | Picture | pc |
| Credit | ct | Postscript | ps |
| Cross Reference | cx | Preface | pf |
| Data | dt | Publication Title | pt |
| Dedication | dd | Publisher | pb |
| Email Address | em | Pullquote | pl |
| Fax # | fx | Rules | ru |
| Figure | fg | Salutation | sa |
| Footer | ft | Sidebar | sb |
| Footnote | fn | Signature | sg |
| Foreward | fw | Sincerely Line | sn |
| Graphic | gr | Story | st |
| Header | HD | Subject | SB |
| Identifier | id | Sublist | sl |
| Illustration | il | Table | tb |
| Index | ix | Table of Contents | yc |
| Ink | ik | Video | vd |
| Introduction | in | Voice | vc |

The second two character field is referred to as a style tag 106. The style tag 106 identifies any modifications to the paragraph type that might be required by a potential conflict of structure. As an example, a portion of a document might be tagged as BD (body) with a style tag 106 indicating that the content of the body is a list, or that the body should be emphasized (i.e., structured) in a particular way (such as with boxing, outdents, or the like). Example style tags 106 are listed in Table II.

TABLE II

| STYLE | CODE |
|---|---|
| Tags | s |
| Force Just | fj |
| Indented | in |
| Justified | ji |
| Large | lg |
| Ragleft | rl |
| Ragright | rr |
| Small | sm |

The third two character field of the tag 100 is a substyle tag 108. This two-character field identifies any modifications to be made to individual character formatting within a particular paragraph. Typical substyle tags include bl (bold), cn (condensed), double underline (du), italic (it), and the like. Other substyle tags 108 are shown in Table III.

TABLE III

| SUBSTYLE | CODE | SUBSTYLE | CODE |
|---|---|---|---|
| Bold | bl | Larger | lr |
| Condensed | cn | Light | li |
| Double underline | du | Marked | mr |
| Dropfirstcap | dc | Smaller | sr |
| Expanded | ex | Strikethru | st |
| Fat | ft | Subscript | s1 |
| Heavy | hv | Superscript | s2 |
| Indexed | in | Underline | un |
| Italic | it | | |

Figure 3C:
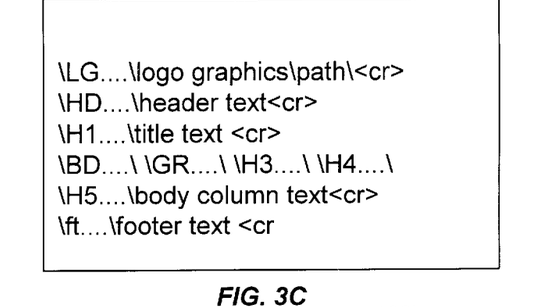
FIG. 3C is a representation of a format of a file for use in the computer and software systems of FIG. 2.

A depiction of an input file 120, formatted for display by a computer system 40 utilizing the present invention, is shown in FIG. 3C. Note that the format of the file 120 shown in FIG. 3C differs from the format of the file 30 shown in FIG. 1B only in that tags and graphics information are included. The tags 100 are used in applications software 78 to direct (or "flow") text or graphics information to a particular frame. For example, in file 120 of FIG. 3C, the tag 100 ("\LG....\") informs applications software that the data which follows is graphics data to be flowed to a logo frame 82 for display on display device 44. The use of a pair of periods ("..") for the style and substyle tags 106, 108 indicates that default styles are to be used. Specifically, in one particular implementation of the present invention, if the flow tag 104 contains "..", the system assumes that the tagged content belongs in the current frame (i.e., that no frame change is required). If the style tag 106 contains "..", the system assumes that the tagged content is to take on the character formatting of the previous paragraph. And when substyle tag 108 contains "..", the tagged content will assume the prevailing character formatting of the current paragraph. Graphics tags (e.g., LG, or logo tags) are slightly different than text tags. Binary graphics data typically cannot be parsed into a text stream. Therefore, a graphics tag, in one specific implementation, is followed by text indicating a path to the graphic file (which may be stored in any standard graphics format, such as GIF). The path to the graphics file may then be followed by a backslash character "\" to alert the system that the end of the graphics tag has been reached.

The tag 100 of the present invention has several characteristics. The tag language used is generic. That is, the same tag may be assigned several different human-readable names so that the names may be properly descriptive when stored with a particular metaform. For example, a newspaper metaform and a report metaform may both use the same flow tags 104 (e.g, the flow tags for headline, subhead level 1 and subhead level 2). However, the tag (listed in human-readable form) associated with the newspaper metaform may be termed "headline", "subhead" and "section head" to more descriptively refer to the frames used in particular applications. The human-readable tags associated with the report metaform may be termed "title", "chapter" and "section". This ability to map tags 100 of the present invention permits easy internationalization of metaforms, as only the human-readable names of the tags, not the tags themselves, need to be localized. Further, the hierarchical tagging scheme of the present invention permits ready importation of HTML-formatted data. Data formatted using certain other SGML dialects and HTML variants (such as HTML+) may also be readily imported or easily translated for use in the present invention.

This simplified and efficient tagging scheme enables easy formatting of files for use in the present invention. The scheme minimizes the amount of tag information required to format a file for use in the present invention, thus ensuring that file size is kept to a minimum. File size is frequently a concern when files are transferred to small computers such as personal communicators. These systems operate most efficiently with small files. Further, users are transmitting more and more files over wired and wireless media (such as cellular or wired telephone systems). Transmission costs and transfer times are reduced when smaller files are used. In addition, storage and archival costs are minimized when files are kept as lean as possible.

Figure 4:
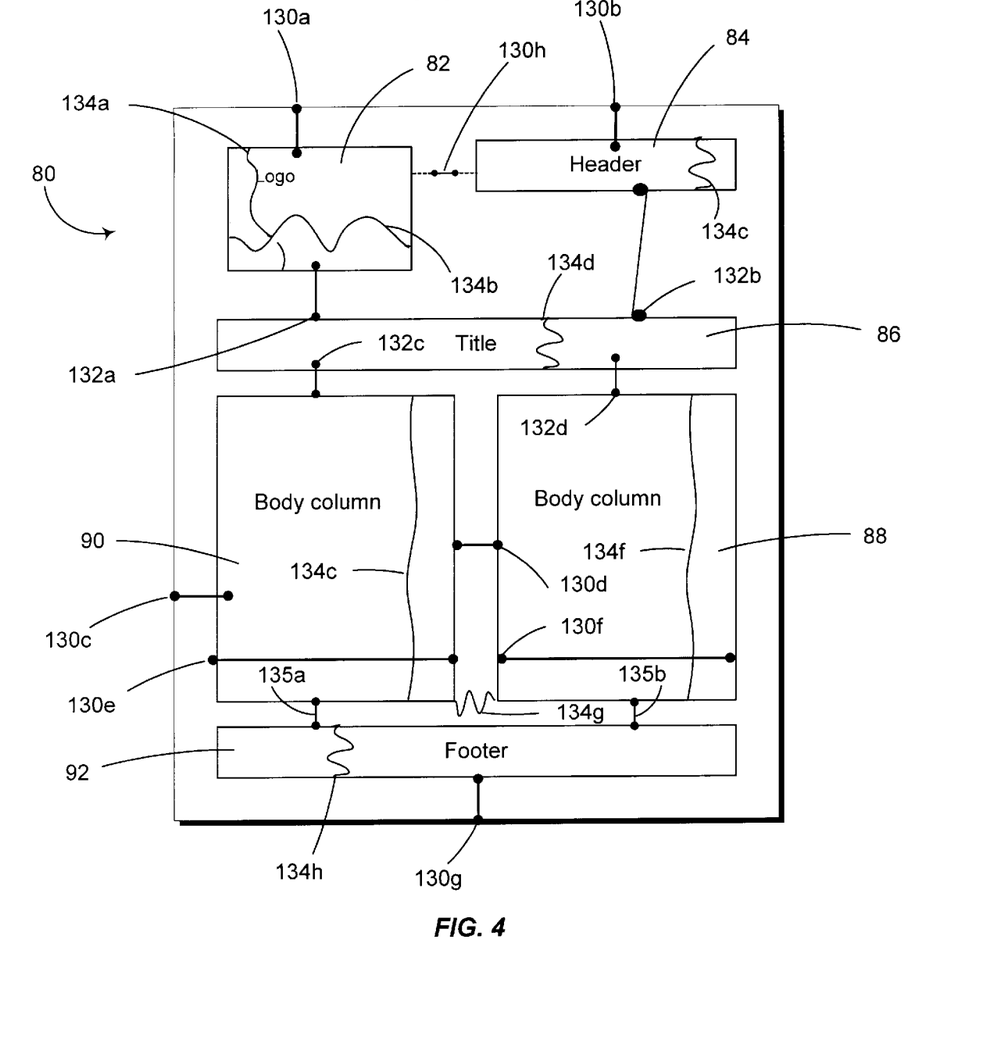
FIG. 4 is the screen display of FIG. 3A indicating possible constraint relationships.

Other features of the present invention, which will now be described by first referring to FIG. 4, allow dynamic sizing of frames displayed on display device 44. FIG. 4 shows a specific metaform 80 displayed on display device 44. Again, metaform 80 is a sample newsletter metaform displaying the information from the newsletter 10 of FIG. 1A. Metaform 80 contains a plurality of frames 82–92 in which specific pieces of information are displayed. Metaforms for use in the present invention are created, in one specific embodiment, using Microsoft Visual C++. In defining a metaform, the frames are first defined using a base grid. The base grid, or page grid, provides a regular division of the overall display area. Frames are established and defined to present a specific presentation of data, such as the newsletter metaform 80 of FIG. 4. Once the frames 82–92 are initially defined, each frame is tagged to define the type of data it is to accept. For example, frame 82 is tagged to accept logo (or .lg) data. Frames may include several tags. Frame 82, being a graphics frame, may also be defined as accepting a graphic (.gr) or even video data (.vd), for example. As will be discussed, by providing several acceptable tags for each frame, the system may dynamically port incoming data to alternative frames for display. After each frame 82–92 has been defined and tagged, the next step in creating a metaform 80 is to define constraint relationships between each of the frames.

FIG. 4 includes a number of links 130, 132, and 134 which demonstrate constraint relationships for each of the frames 82–92. A constraint describes a relationship that must hold between multiple variables. For example, a constraint can be defined which will maintain an alignment between two objects, despite the ability of the two objects to expand or contract. In the present invention, constraints are employed to maintain consistent relationships between frames as the frames change size and/or location on the display device 44.

Links 130, 132, and 134 demonstrate the constraint relationship between various frames of metaform 80. For example, links 130a–g (displayed as thick lines) indicate fixed relationships or required constraints. Link 130a represents a required constraint between logo frame 82 and the edge of display device 44. This relationship may be defined, e.g., to maintain a fixed size border along the outside of the display 44. Thus, if the size of the logo in frame 82 is increased, the fixed relationship identified by link 130a will not change. Other links 130b, 130c, 130g representing margins may also be fixed using required constraints. Similarly, distances between columns 130d or widths of columns 130e, 130f may also be defined using required constraints. Not all relationships between frames are fixed. For example, certain relationships may be overridable to allow repositioning of one or more frames as input data is flowed in the frame. If the header frame 84 expands to accommodate additional data, for example, the title frame 86 may need to be repositioned in the Y-direction. Such relationships, in this particular example, are indicated by links 132*a–d*. Still other constraints may be classified as grow constraints. Examples are indicated by links 134*a–h*. In frame 90, e.g., when additional data is flowed into the first column of the newsletter, the body column frame 90 must expand to accommodate the additional data. Thus, a constraint system is employed in the present invention to dynamically size and position frames as data is flowed into them. The constraint system is also used to define basic screen layouts for different display devices 44. For example, if display device 44 is a six inch diagonal screen for a PDA, individual frame sizes will be more severely constrained than if display device 44 were a fifteen inch diagonal monitor on a desktop computer system.

Constraints may be one-way or multi-way. A one-way constraint operates in only one direction. As a simple example, a constraint establishing that a variable "B" will be set equal to the value of a variable "A" when "A" changes in value is a one-way constraint. A multi-way constraint system ensures that "B" will change as "A" changes, and vice versa. The constraint system of the present invention is a multi-way constraint system. In one specific implementation, the present invention utilizes binary constraints (i.e., constraints limited to two variables) to avoid synchronization issues. The newsletter metaform 80 includes both one- and multi-way constraints. For example, link 132*c* is a multi-way constraint. That is, if the size (position) of title frame 86 changes, the position of body column frame 90 must also change. Likewise, if the position of body column frame 90 changes, the position of title frame 86 may also be affected. The constraint system of the present invention, in one specific embodiment, solves each constraint relationship sequentially before the final image is displayed on display device 44.

In one specific embodiment of the present invention, a variety of constraint types are used which are subclasses of an abstract base class termed "MBConstraints". The abstract base class contains variables which identify the constrained objects and whether the constraint is one way or multi-way. Subclasses override critical methods, fill in variables, and initialize subclass variables. New types of constraints may be added to the system by overriding execution methods of existing constraints.

Constraints may be used to allow an infinitely scrolling display or they may be used to ensure that single pages of information are displayed together. For example, referring again to the newsletter metaform 80, if body columns 88 and 90 are not constrained to a single page, scrolling via user input device 54 may be required to view all the information contained in those frames. However, if the newsletter metaform 80 demands that all frames be constrained to a single page (or a single screen on display device 44), a user may need to page down using input device 54 to view additional pages of information. For instance, in the sample newsletter metaform 80 of FIG. 4, the footer frame 92 has a fixed constraint 130*g* tying it to the bottom of the page (or screen). Fixed stand-off constraints 135*a* and 135*b* ensure that body column frames 88, 90 do not encroach upon the footer frame 92. If either of the body column frame 88 or 90 increases in size such that constraints 135*a* or 135*b* are violated, the system of the present invention commences flowing data to a second page, or a second metaform for the new information. This ensures that incoming data is flowed in a coherent and logical manner into predefined frames. Alternatively, or additionally, the system may first locate another appropriate frame on the current page for the overflow information. An appropriate frame is one which is tagged to accept the same or similar data (e.g., another frame that is tagged to accept .BD or body information).

Figure 5:
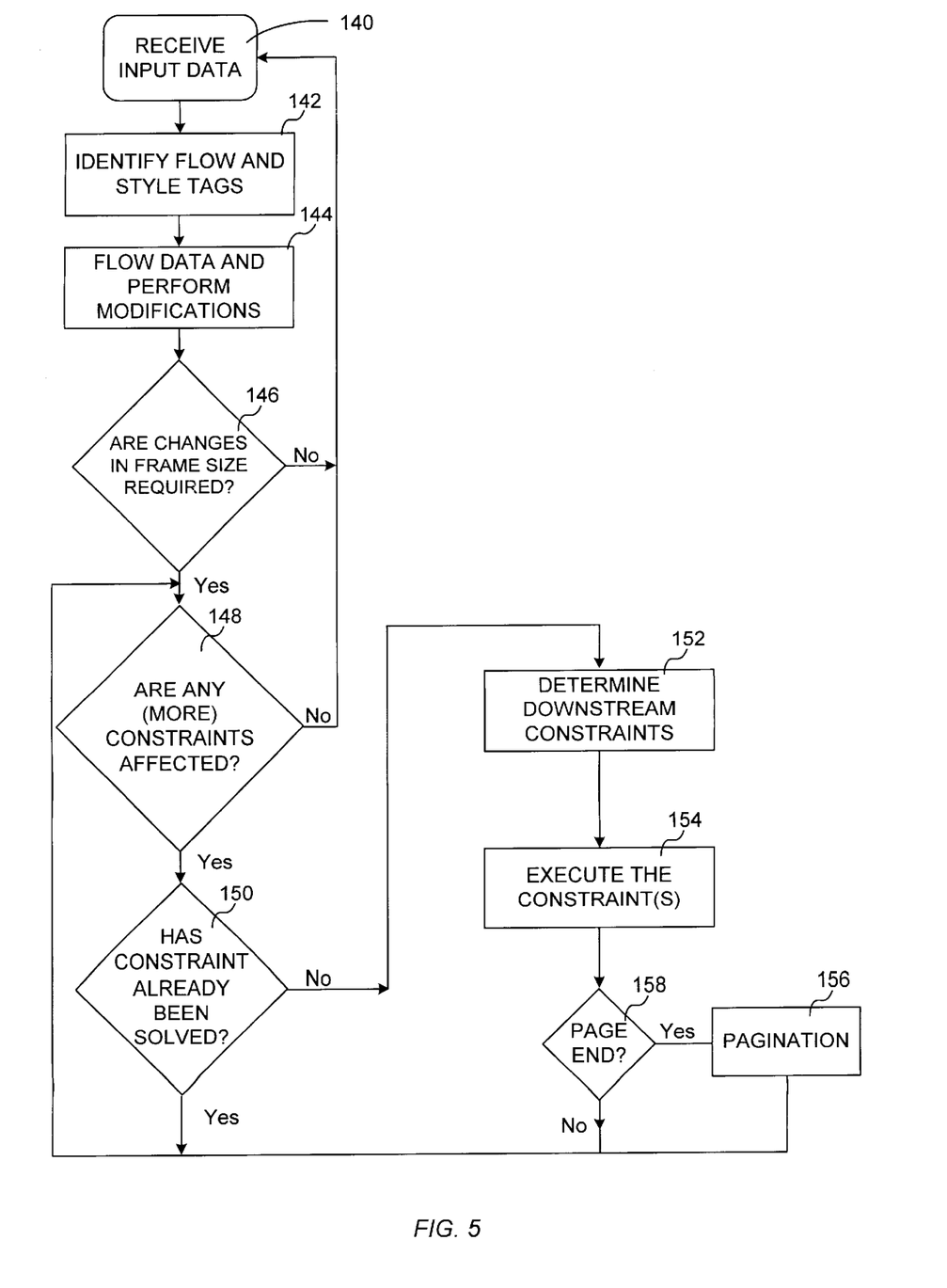
FIG. 5 is a flow diagram depicting operation of a system according to the present invention.

The solution of constraints and the general operation of the present invention will now be described by referring to the flow diagram of FIG. 5. For the purposes of this sample description, it will be assumed that the specific metaform of FIGS. 3 and 4 has been selected for use (i.e., the newsletter metaform 80) and that the input data resides in file 120 of FIG. 3C. Operation commences as the applications software 78 receives input data 140. This input data 140 may be received from information source 62 via transmission channel 60 or from any other channel and source. Input data may, e.g., be in the form of a retargetable data stream (RDS) file containing no formatting information other than tags 100.

Applications software 78 then, in step 142, functions to identify the first set of tagged information from input file 120. Tagged information in an RDS file is identified by locating double backslash characters "\\" which set tagged information apart from text or graphics information. Therefore, the first flow tag 104 identified in this example would be "LG". Once a flow tag 104 has been identified, applications software 78 operates to determine the proper frame within a metaform into which data is to be flowed. Applications software 78 also functions to compose both text and graphics for insertion into a frame. Specifically, composition of the data for a frame includes modifying text or graphics as indicated by style and substyle tags 106, 108. In one specific embodiment, applications software 78 performs the composition and flow of data to frames using an object-oriented composition engine responsive to specific flow, style, and substyle tags 104, 106, 108. As required, applications software 78 grows or shrinks the frame as new lines of text or graphics are composed.

In this particular example, applications software 78 will determine that the logo data identified by the flow tag LG is to be flowed to frame 82 of metaform 80. Default style and substyle tags will be used. As applications software 78 flows the information to the target frame (frame 82), the system determines whether the size of the frame will be affected. When a particular frame of a metaform is changed in size in any way, a constraint solver is invoked. As shown by decision block 146, if no change in frame is required, applications software 78 returns to receive more input data 140. If a change in frame size occurs, applications software 78 determines whether any constraints are affected 148.

Each metaform includes a list of constraints to be managed for that particular metaform. When it is determined that a frame of a metaform requires a change in size, applications software 78 determines which constraints require solving as a result of that change in size. This includes determining those constraints which are directly affected and those constraints which may be affected downstream 152. For example, when logo data is flowed into frame 82 of metaform 80, five constraints may be directly affected depending upon the size of the image imported. Two of the constraints are fixed constraints 130*a*, 130*h* which maintain proper spacing of logo frame 82 on the screen of display device 44. Applications software 78 will not allow expansion of the logo 82 beyond those initial fixed spacings. Two of the constraints are grow constraints 134*a* and 134*b* which allow expansion of the image in two directions. A fifth constraint 132*a* is an overridable constraint which may be overridden if necessary. Thus, if the logo input in file 120 is larger than the default size of logo frame 82 of metaform 80, a number of direct constraint relationships must be solved.

Before solving a constraint, applications software 78 first determines whether the constraint has already been solved in the current solution cycle 150. This avoids repetitive solution of constraints for a frame which is affected by more than one constraint relationship. Constraints are then executed in step 154. Thus, for an expanding frame which has a number of constraints (immediate and downstream) to be solved, each constraint is solved sequentially until all relationships are resolved. Once all the constraints have been solved for a particular frame, applications software 78 returns control to step 140 to receive further input data. For example, for the example metaform 80 of FIG. 4, one possible constraint solution sequence would be 134*a*, 134*b*, 130*h*, 132*a*, 134*c*, etc., until each constraint of the metaform 80 is solved. Typically, in english-language applications, the constraints will be solved from the top of the form to the bottom, and from the left of the form to the right. It is also possible, however, to utilize other solution sequences.

The input of data 140, identification of tags 142, composition and flow of information 144, and constraint execution 154 are repeated until all information is generated and flowed for a particular metaform. Thus, the actual image displayed on a display device 44 depends upon the nature and amount of data input to each frame. The title frame 86 may, e.g., be larger than body column frames 88, 90. Footer frame 92 may not be displayed in certain situations where no footer data exists in an input file. Further, depending upon the use or non-use of a fixed constraint at the bottom of the metaform (such as constraint 130*g* of metaform 80), the input data may be displayed over several different screens which may be viewed by scrolling using a user input device 54. Each specific metaform, such as the newsletter metaform 80, may include definitions for the second, and subsequent pages of the newsletter. Thus, when constraints are executed in step 154, if a new page of the metaform is affected, a pagination step 156 must also be performed. The newsletter metaform 80, for example, may be defined as displaying only two columns of text on all pages after the first. As text is flowed into each column and the end of a page or screen is reached (i.e., the page bottom constraints are violated), the applications software determines the format of the next page, and flows the text into any appropriate frame(s) available. The present invention may also incorporate criteria which first attempts to locate another suitable frame on the current page for the extra information. For example, when a frame has grown such that a pagination should occur, applications software 78 may first review other frames on the current page to determine if any of them may accept the overflow data from the current frame.

Those skilled in the art will appreciate the number and variety of combinations of metaforms which may be utilized using techniques of the present invention. Further, specific metaforms may be developed for particular screen and display types to effectively utilize available space and size. Thus, a system 40 may include a variety of metaforms. Applications software 78 may be augmented with additional capabilities to effectively manage a library of metaforms. Conversely, a system 40 may (due to storage or other limitations) include only a few commonly-used metaforms. To allow a system with a limited number of metaforms to accept a wide array of data, applications software 78 may include the ability to reflow incoming data to those frames which are available. For example, if the particular metaform for which a document was originally formatted is not available on the computer system 40 that receives it, applications software 78 may be equipped with an ability to substitute another metaform from those metaforms which are available in system 40. If, for example, a newsletter formatted for the particular newsletter metaform 80 discussed above is received in a PDA that does not have a newsletter metaform, applications software 78 may be used to reflow the data from the input file to, e.g., a newspaper metaform.

To achieve this substitution, metaforms according to the present invention may be identified by a type code for each form, indicating a particular metaform type. One specific format of a type code for use in the present invention comprises three fields, including: a field indicating the "style" of the metaform; a field indicating the "form" of the metaform; and a field noting the output format for the metaform. For example, the style field may indicate whether the form is used with graphics, text, or the like. Hexadecimal values may be used to note the style of each metaform. Hex values may also be used to indicate the form of the metaform, e.g., a newsletter metaform may be noted by a hex value of "D" and a report metaform noted by a hex value of "FO". If a particular form or style of metaform is not available on a system, substitution may be made by utilizing an available form which has the nearest style and form values (in hex). The output format of a particular metaform is a user proffered selection, and may include options such as print, fax, small screen, or large screen. These fields, and others, may be used by applications software 78 to select the most appropriate available metaform 80 when the requested metaform is not present in the system. Use of such criteria allows the system to provide the most suitable alternative format for the display of particular information.

While the invention is described in some detail with specific reference to a specific preferred embodiment and certain alternatives, there is no intent to limit the invention to that particular embodiment or those specific alternatives. For example, a sample utilizing a newsletter metaform has been referred to throughout the specification. However, those skilled in the art will realize that the present invention may be employed for the display and use of a variety of data and information. Further, although the sample discussed in the specification showed only one specific page of information, the present invention is well-suited to the display and flow of multiple pages of information. The present invention may also be used for the input of user data from a keyboard or other input device.

Thus, the true scope of the present invention is not limited to any one of the foregoing exemplary embodiments but is instead defined by the following claims.

What is claimed is:

1. A method for manipulating and outputting information in a computer system, the computer system including an output device and a data input device, the method comprising the steps of:

receiving, through said data input device into said computer, a flow of input data including a plurality of sets of input data said input data including data and a plurality of data type identification tags, at least one said set of input data without a frame assignment;

determining, using said computer, an output format of said plurality of sets of input data based on said flow of input data including automatically determining a number of frames in said output format based on said flow of input data and output characteristics determined by said computer system, said output format having at least a first and a second automatically determined output frame, each having a plurality of defined constraints;

automatically assigning to said at least first and second automatically determined output frames and automatically flowing, using said computer, each of said sets of input data including said at least one set of input data without a frame assignment into a selected one of said at least first and second output frames by matching said data type identification tag included in each of said sets of said input data with a corresponding data type identification tag in each of said output frames;

evaluating, in said computer, said plurality of constraints when each of said sets of input data are flowed, and placing and sizing said at least first and second output frames to accommodate said input data; and outputting said input data in said at least first and second output frames on said output device of said computer system.

2. The method of claim 1 wherein said input data includes text and graphics data.

3. The method of claim 1 wherein said output format includes a plurality of pages and at least one of said plurality of constraints is a fixed page constraint, wherein said step of evaluating each of said plurality of constraints further includes determining whether said fixed page constraint is violated.

4. The method of claim 3 further comprising the steps of:

selecting, using said computer, a new page of said output format when said computer determines that said fixed page constraint is violated, said new page of said output format having at least a third display frame having a plurality of defined constraints;

automatically assigning and flowing a portion of said plurality of sets of said input data into said at least third display frame by using said computer to match data type identification tags associated with said portion of said plurality of sets of said input data with corresponding data type identification tags associated with said at least third output frame;

evaluating, using said computer, said plurality of constraints affected by said step of flowing and sizing said at least third display frame to accommodate said portion of said plurality of sets of said input data; and outputting said portion of said plurality of sets of said input data in said at least second output frame on said output device of said computer system.

5. The method of claim 3 further comprising the steps of:

selecting, using said computer, a new output frame for the output of said input data when said computer determines that said fixed page constraint is violated; and automatically assigning and flowing said portion of said plurality of sets of said input data into said new output frame by using said computer to match data type identification tags associated with said portion of said plurality of sets of said input data with corresponding data type identification tags associated with said new output frame.

6. The method of claim 1 wherein said computer system is a desktop computer system.

7. The method of claim 1 wherein said computer system is a personal digital assistant.

8. A system for outputting data, comprising:

an output device;

a data input device;

a processor programmed to:

(a) receive a flow of input data from said data input said input data including data and a plurality of data type identification tags, at least one said set of input data without a frame assignment;

(b) determine an output format of said flow of input data including determining a number of frames in said output format based on said flow of input data and output characteristics determined by said computer system, said output format having a plurality of output frames, each output frame having at least one defined constraint;

(c) automatically assign and flow said data including said at least one set of input data without a frame assignment into appropriate determined output frames by matching data type identification tags associated with said data to corresponding data type identification tags associated with said plurality of output frames;

(d) solve each of said constraints affected by the flow of said data;

(e) dynamically size each of said output frames; and (f) output said input data in said output frames on said output device.

9. The system of claim 8 wherein said data input device is a computer keyboard.

10. The system of claim 8 wherein said data input device is a modem coupled to a telephone line.

11. A computer system for outputting data, comprising:

means for receiving input data said input data including data and a plurality of data type identification tags at least one said set of input data without a frame assignment;

means for selecting an appropriate output format for said input data, including automatically determining a number of frames in said output format based on said flow of input data said output format selected by said computer system by evaluating data type identification tag information provided in said input data, said output format having a plurality of output frames each having at least a first constraint upon the frame;

means for associating portions of said input data with an appropriate output frame including said at least one set of input data without a frame assignment by using said computer system to evaluate said data type identification tag information provided in said input data and data type identification tag information provided with each of said output frames;

means for resolving each of said constraints upon said output frames using said computer system; and means for outputting said input data in said output format.

12. The system of claim 11 wherein said means for selecting further comprises means for storing a plurality of output formats, each of said output formats having an identifiable output type.

13. The system of claim 11 wherein said means for resolving each of said constraints further comprises means for sequentially executing each of said constraints in said output format.

14. A method for operating a digital computer to output input data from a flow of input data, the method comprising the steps of:

receiving said input data in said digital computer, said input data having a plurality of tags placed between text and graphics data, at least one set of said input data without a frame assignment;

selecting, using said digital computer, an appropriate output format for said input data based upon said tags located in said input data said output format including an automatically determined number of frames based on said flow of input data;

operating said digital computer to automatically assign and flow said input data into a plurality of output frames including an automatically determined number of frames defined by said selected output format based upon said tags located in said input data, each of said plurality of output frames having tags corresponding to said tags located in said input data;

dynamically sizing and positioning said plurality of output frames, using said digital computer, as said data is flowed into said frames;

evaluating established constraints associated with said plurality of output frames using said digital computer to maintain established relationships between said plurality of output frames as said frames are dynamically sized; and outputting said input data in said appropriate output format on a an output device coupled to said digital computer.

* * * * *